July 8, 1952     L. CROWE ET AL     2,602,280

ROTARY SIDE DELIVERY RAKE

Filed March 15, 1952     3 Sheets-Sheet 1

LOUIS CROWE
RICHARD M. WORREL
INVENTORS

HUEBNER, BEEHLER, WORREL,
HERZIG & CALDWELL
ATTORNEYS

BY Richard M. Worrel

July 8, 1952        L. CROWE ET AL        2,602,280
ROTARY SIDE DELIVERY RAKE

Filed March 15, 1952        3 Sheets-Sheet 2

LOUIS CROWE
RICHARD M. WORREL
INVENTORS

HUEBNER, BEEHLER, WORREL,
HERZIG & CALDWELL
ATTORNEYS
BY

July 8, 1952
L. CROWE ET AL
2,602,280
ROTARY SIDE DELIVERY RAKE
Filed March 15, 1952
3 Sheets-Sheet 3
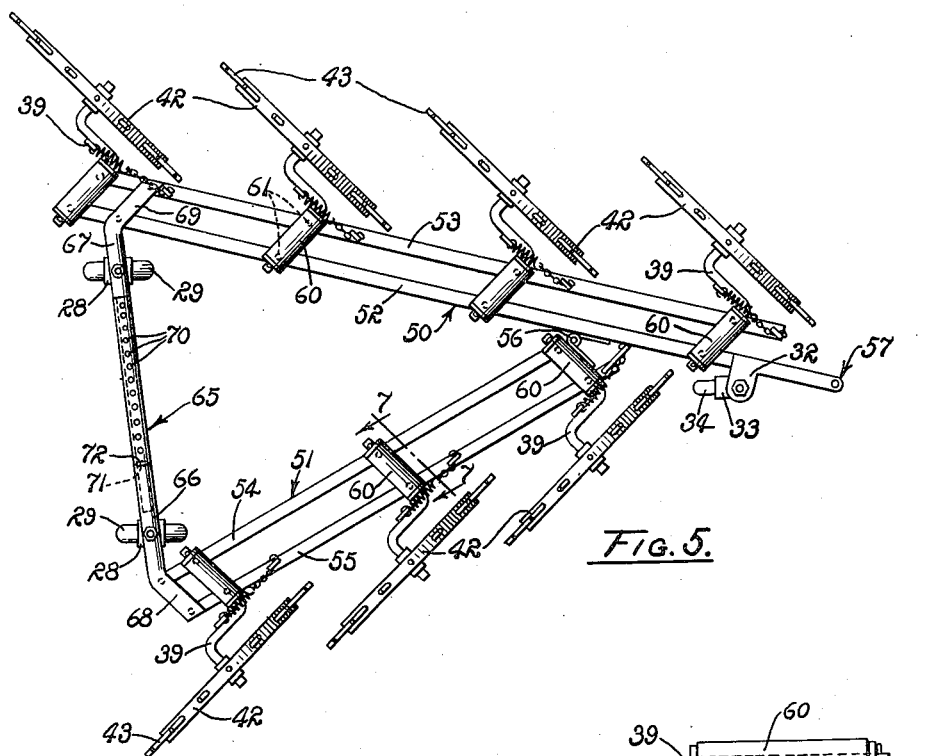
Fig. 5.
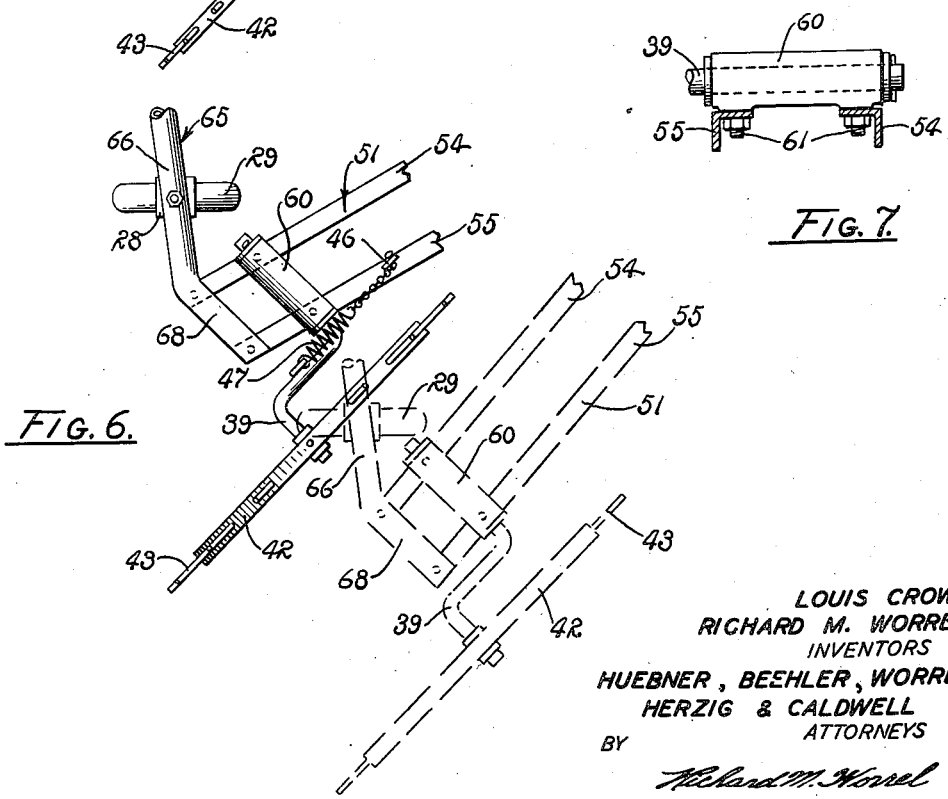
Fig. 6.
Fig. 7.
LOUIS CROWE
RICHARD M. WORREL
INVENTORS
HUEBNER, BEEHLER, WORREL,
HERZIG & CALDWELL
ATTORNEYS
BY Richard M. Worrel

Patented July 8, 1952

2,602,280

UNITED STATES PATENT OFFICE 2,602,280

ROTARY SIDE DELIVERY RAKE

Louis Crowe, Banta, and Richard M. Worrel, Fresno, Calif., assignors to Melvin A. Morrill, Laton, Calif.

Application March 15, 1952, Serial No. 276,792

4 Claims. (Cl. 56—377)

The present invention relates to rotary side delivery rakes and more particularly to such rakes having adjustable swath control.

Recent innovations in the raking art having to do with the employment in side delivery rakes of a plurality of rotatably mounted raking wheels arranged in echelon relative to the direction of movement of the rake have proved exceedingly popular. Such rakes mount the raking wheels for individual elevational movement in traversing uneven terrain. Before these innovations, the raking swathes which a side delivery rake could achieve were seriously restricted. Any unevenness in a field being raked caused such stresses and strains even on relatively narrow conventional side delivery rakes as to subject them to frequent structural failures and rapid deterioration. The adaptability of the side delivery hay rakes employing individually floating raking wheels obviated this difficulty and made possible the increase in raking swathes generally but it has been found that in exceeding wide swathes the employment of a single echelon of such raking wheels of great length can prove cumbersome.

The applicant has discovered that this cumbersome operation in rakes capable of exceedingly wide swathes can be obviated by employing a pair of echelon arrangements of such raking wheels arranged in a V, or wedge, association for delivery of encountered hay and the like to each side of a line of draft. The present invention features such an association and additional structure possessing further utility, as will subsequently become apparent.

As is apparent, the swaths of rotary side delivery wheel rakes can be adjusted by exercising control over the angle at which the echelon of raking wheels is drawn over material to be raked. That is, if the echelon forms an acute angle to the line of draft a narrow swath is raked, and as the angularity between the echelon of raking wheels and the line of draft is increased, the width of the swath will be responsively increased. However, under most raking conditions the individual wheels perform most satisfactorily when they are angled between 35 and 55 degrees relative to the line of draft. This restricts the adjustability of the echelon arrangement of such rakes in varying the swath, to angles at which the raking wheels successfully operate. Heretofore, adjustable angling of the echelon responsively modified the angularity of the individual wheels relative to a line of draft. The present invention contemplates the adjustable angling of the echelons of raking wheels through the provision of adjustable direction control means while the angularity of the individual wheels is maintained within efficient limits of angularity relative to a line of draft through controlled connection with the direction control means. This feature is made available in rakes of both single echelon and double echelon of V arrangement.

An object of the present invention is to provide a side delivery rake of the rotary wheel type adapted to the gathering of hay and the like into a pair of windrows at opposite sides of a swath of greater width than heretofore considered possible.

Another object is to increase the efficiency of raking hay through the provision of a rake of increased swath having unimpaired raking speeds.

Another object is to provide a side delivery rake readily adjusted to various widths of raking whereby the rake may be readily adapted to various raking requirements.

Another object is to provide a side delivery rake of the character described which readily adapts itself to uneven terrain encountered in wide swath raking.

It is known that rotary side delivery rakes employing rotary raking wheels require directional control. It is a further object to provide in a side delivery rake of such character which is adjustable as to raking swath, automatic direction control adjustment in response to adjustment of the rake to control the swath.

A further object, as will become clearly evident in the description of the second form of the present invention is to provide automatic and corresponding adjustment of the angularity of the rotary raking wheels employed in such rakes in response to adjustment of the rake to modify the swath whereby independent of swath width the raking wheels maintain angular relations to lines of draft conducive to raking efficiency.

Still further objects and advantages will become apparent in the subsequent description.

Referring to the drawings:

Fig. 5 is a plan view of a second form of the present invention providing not only the simultaneous adjustment of rake width and direction control but in addition thereto responsive adjustment of angularity of individual raking wheels employed therein relative to the frame on which they are supported.

Fig. 6 is a fragmentary plan view of the rake shown in Fig. 5 demonstrating the responsive adjustment of direction control means and angularity of the raking wheels in response to adjusting of the rake for increased or decreased swath.

Fig. 7 is a sectional detail of the rake shown in Fig. 5 taken on line 7—7 thereof.

Figure 1:
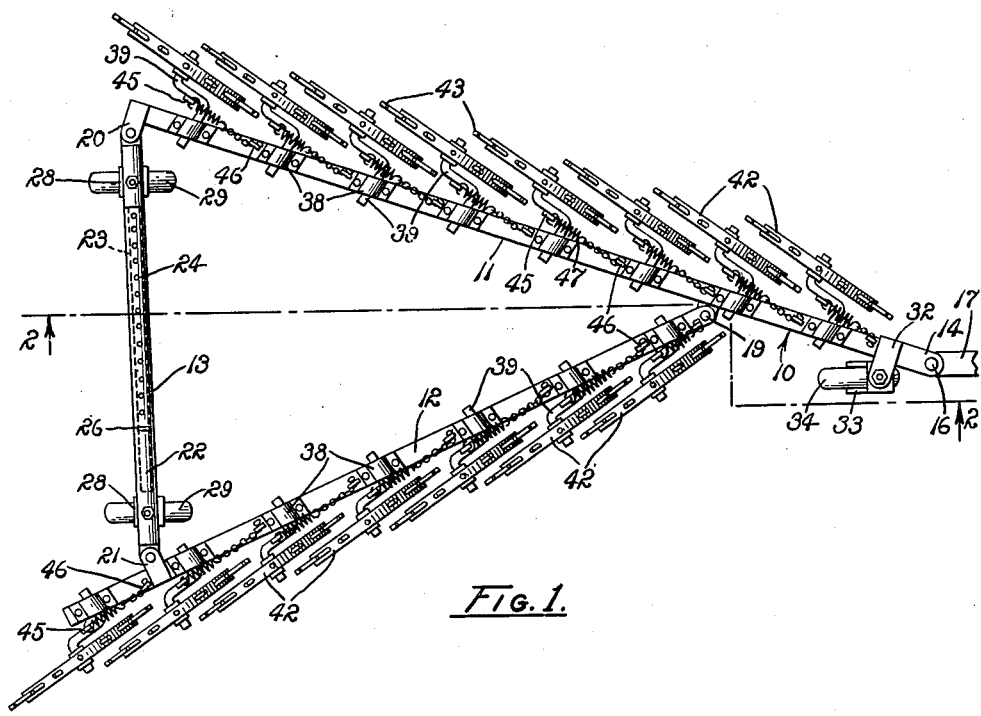
Fig. 1 is a plan view of a rotary side delivery rake of V form illustrating swath adjustment and direction control features of the present invention.
Figure 2:
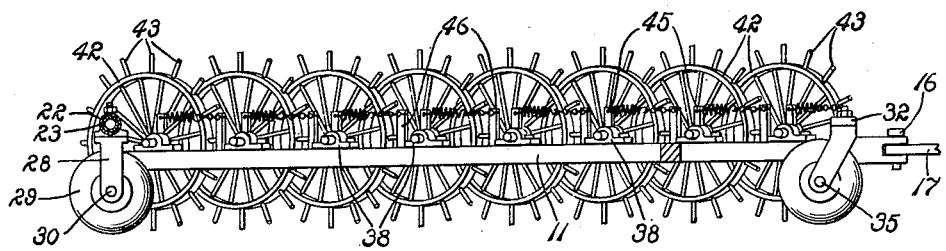
Fig. 2 is a longitudinal sectional view of the rake shown in Fig. 1 taken on line 2—2 thereof.
Figure 3:
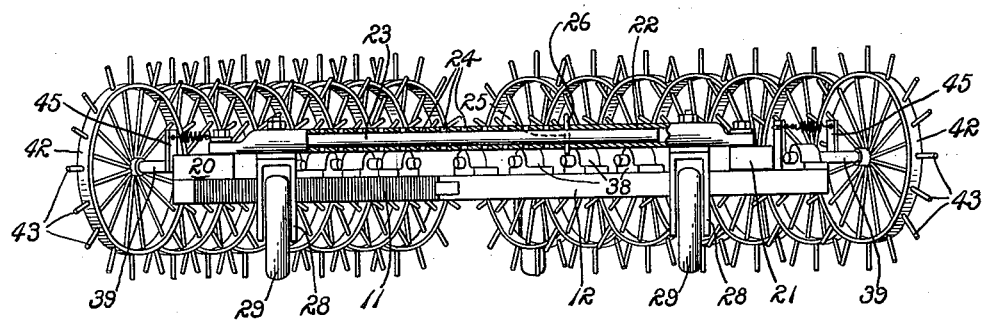
Fig. 3 is a rear elevation of the rake shown in Figs. 1 and 2.

Referring in greater detail to the drawings:

In Fig. 1 a support frame is indicated generally at 10 having a pair of pivotally interconnected, angularly related legs 11 and 12 having spaced extended ends interconnected by a telescopically adjustable beam 13. The leg 11 is preferably longer than the leg 12 for convenience in draft connection and provides at the forward end portion thereof a pair of vertically spaced, horizontally extended plates 14 through which vertically aligned openings are formed for the reception of a pin 16 in connecting the leg to the draft hitch of a draft appliance fragmentarily illustrated at 17.

The leg 12 has a forward end portion pivotally connected, as at 19, for relative horizontal movement to the leg 11 at a position rearwardly spaced from the forward end portion thereof.

A bracket 20 is mounted on the rearward end portion of the leg 11 and a corresponding bracket 21 mounted on the leg 12 at an equal distance from the pivotal interconnection of the legs. The telescopic beam 13 includes a tubular member 22 pivotally connected to the bracket 21 and a tubular member 23 pivotally connected to the bracket 20. The tubular member 23 is of smaller diameter than the tubular member 22 and is slideably fitted therein. A plurality of bores 24 are formed vertically through the outer tubular member 22 in an arrangement longitudinally thereof. The inner tubular member 22 has a bore 25 formed therethrough which can be aligned with any of the bores 24. A locking pin 26 is inserted through the bores 24 and 25 positioned in alignment and serves to lock the telescopic beam 13 in adjusted length. It is obvious that other means for locking the beam 13 in telescopic adjustment may be employed. The structure of the beam and the means for locking the telescopic adjustment exemplify a form suitable to the present invention but it is to be understood that other means may be employed for accomplishing the adjustable spacing of the rearward ends of the legs 11 and 12 without departing from the spirit or the scope of the invention.

A bifurcated yoke 28 is rigidly mounted in downwardly disposed position on each of the tubular members 22 and 23 of the beam 13 adjacent to the brackets 20 and 21, respectively. Direction control wheels 29 are rotatably mounted in each of the yokes, by axles 30. It is to be noted that the yokes are rigidly mounted on the beam 13 so that the wheels 29 are mounted for rotation in erect parallel planes in alignment with the intended direction of movement of the rake and in fixed angular relation to the beam.

A strut 32 is laterally extended from the leg 11 near the forward end portion thereof and mounts a depending swivel yoke 33 therein. A swivel wheel 34 is journaled in the yoke 33, as on an axle 35, and provides support for the forward end portion of the frame 10. Whenever a traction force is imparted to the frame by connection to the plates 14, either by draft hitch, cable, or other means, the rigidly mounted direction control wheels 29 readily aligns the rake, upon forward movement, with the direction of draft imparted thereto, the swivel wheel 34 accommodating such alignment.

A plurality of bearings 38 are mounted transversely of the legs 11 and 12 substantially equally spaced therealong. To achieve overlapping effect by opposite sides of the rake at the apex of the V frame, a pair of bearings are preferably located forwardly of the pivotal interconnection of the legs on the leg 11. The bearings mounted on an individual leg are preferably parallel and may be rigidly mounted or mounted for adjustable angular positioning as desired.

Crank axles 39 are journaled in the bearings 38 and outwardly extended therefrom. The crank axles are rearwardly off set and thence outwardly extended in parallel relation to the portions thereof journaled in the bearings.

Rotary raking wheels 42 are journaled on the outwardly extended end portions of the crank axles 39 for individual elevational movement by pivoting of their respective crank axles in their bearings. The raking wheels individual to each of the legs, are arranged in echelon angularly disposed to the planes of the control wheels 29. The raking wheels bear radially extended teeth 43 adapted for hay, straw, debris and/or earth engagement as the rake is drawn over the ground. It has been found that the raking wheels operate most efficiently when they are angled between 35 and 55 degrees relative to the line of draft determined by the direction control wheels 29. It is to be observed that the raking wheels individual to each of the legs are arranged for rotation in erect parallel planes and that the rearward portion of each raking wheel overlaps the forward portion of the rearwardly adjacent raking wheel. Also the forwardmost raking wheel borne by the leg 11, overlaps in raking effect, the forwardmost of the raking wheels borne by the leg 12.

To reduce the weight imposed upon downwardly extended teeth of the raking wheels and to facilitate individual floating movement of said raking wheels, lifting arms 45 are welded or otherwise rigidly secured and upwardly extended from each of the crank axles 39. Posts 46 are rigidly mounted on the legs 11 and 12, as by welding, in forwardly spaced relation to each of the lifting arms 45. A tension spring 47 is provided between the upwardly extended ends of each of the arms 45 and their respective posts 46. The strength of the springs is preferably such that in drawing the rake over the ground the raking teeth only lightly skim the earth and upon encountering elevations readily rise thereover. In order to rake effectively through depressions, the springs are of insufficient strength under normal tension completely to lift the raking wheels 42 so that said wheels individually descend into depressions lightly to skim the earth therein. It will be obvious that all of the raking wheels may be elevated from earth and/or crop engagement by drawing the springs more tightly between the lifting arms and the posts. The tightening of the springs may be effected in any convenient manner, none of which constitute a part of the present invention and thus are not illustrated. For example, the posts 46 may have bifurcated upwardly extended end portions in which the springs 47 may be lodged at predetermined longitudinal positions to regulate the tension, or the ends of the springs may be secured to screw threaded rods extended through the posts and tightened by means of nuts mounted thereon in abutting relation to the posts. Other expedients will readily occur to anyone practicing the present invention. This elevating of the raking wheels is accomplished when it is desired to transport the rake.

*Operation*

The operation of the rake of the present invention shown in Figs. 1, 2, 3, and 4 is believed apparent and is briefly summarized at this point. The rake is connected to a draft appliance through the medium of the plates 14 and forward earth traversing movement imparted thereto by such connection. In transporting the rakes, all of the raking wheels 42 are elevated by tightening the springs 47. If the rake is to be drawn down a road, for example, the beam 13 is telescoped, drawing the rearward end portions of the legs 11 and 12 into close proximity so that the rake is narrowed. It is possible, for example, to narrow a rake capable of raking in a swath of thirty feet or more so that its lateral width for transporting is less than that of the average automobile or tractor.

Figure 4:
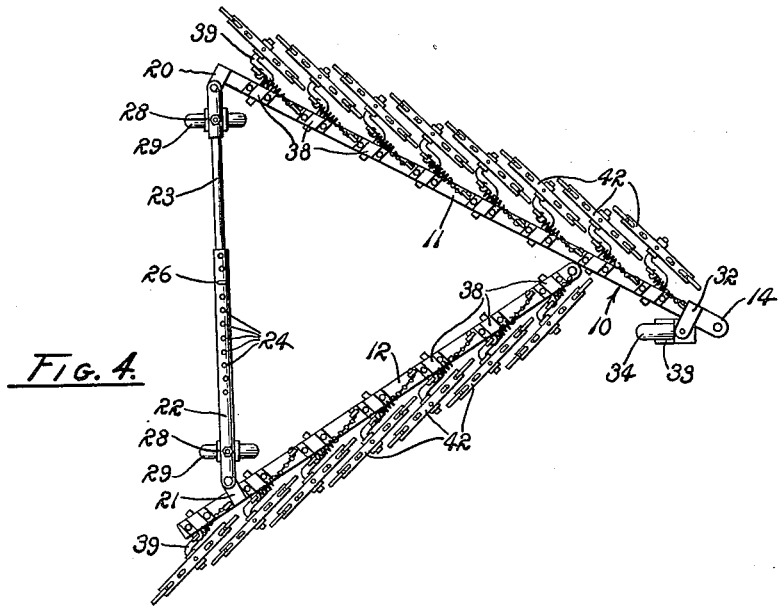
Fig. 4 is a plan view, at reduced scale, of the rake shown in Fig. 1 demonstrating adjustment thereof for wide swath raking operations.

In order to conduct a raking operation, the tension springs 47 are connected so that the teeth 43 of each of the wheels only lightly skim the earth. The telescopic beam 13 is extended to the extent desired to cover a given swath, as illustrated in Figs. 1 or 4. This swath adjustment is significant in adapting the rake to varied raking material, conditions and areas. Inasmuch as the pivotal connections of the opposite ends of the beam 13 to the legs 11 and 12 are equidistant from the pivotal interconnection of the legs, it will be observed that the beam with the portions of the legs 11 and 12 between the beam and their pivotal interconnection, form a bilateral triangle so that the direction control wheels 29 maintain fixed angular relation to a line bisecting the angle formed between the legs. Thus as the frame is widened and narrowed, the direction control wheels 29 assure equal increases and decreases of the angularity of each of the legs relative to the line of draft in response to adjustment for swath increase or decreases.

The adjustment of the rake to regulate the swath is expeditiously effected and may be accomplished at will in response to varied raking requirements.

*Second form*

The second form of the invention, shown in Figs. 5, 6, and 7, substitutes skewable parallelogram structures 50 and 51 for the legs 11 and 12, respectively, of the frame. The parallelogram member 50 employs an inner frame member 52 and a parallel outer frame member 53. The parallelogram member 51 similarly employs an inner frame member 54 and a parallel outer frame member 55. The forward end portion of the inner frame member 54 is pivotally connected to the inner frame member 52 at a position rearwardly spaced from the forward end portion thereof for horizontal pivotal movement, as at 56. As described for the leg 11, the inner frame member 52 of the parallelogram member 50 is provided with a draft connection illustrated generally at 57, conveniently taking the form described for the plates 14.

As shown in Fig. 7, the frame members conveniently take the form of rigid angle iron, or other rigid material and structure. A plurality of bearings 60 are arranged transversely of the parallelogram members and pivotally connected to each of the frame members thereof, as at 61. The bearings individual to each parallelogram member are mounted in parallel positions transversely thereof.

As similarly employed on the leg 11, a strut 32 is laterally extended from the inner frame member 52 and dependently mounts a swivel yoke 33 rotatably mounting a swivel wheel 34 for frame support.

Also as previously described, crank axles 39 are journaled in the bearings 60 and rearwardly and thence outwardly extended therefrom. Raking wheels 42 having radially extended raking teeth 43 are mounted on the extended ends of the crank axles. The raking wheels individual to each parallelogram member are mounted in echelon arrangement for rotation in substantially erect planes angularly disposed to the normal direction of movement of the rake. Arms 45, posts 46 and tension springs 47 are employed as before to reduce and regulate the weight of the raking wheels borne by the teeth. The posts 46 are preferably mounted on the outer frame members 53 and 55 of their respective parallelogram members.

A telescopic beam 65 pivotally interconnects rearward end portions of the inner frame members 52 and 54 at positions equally spaced rearwardly from the pivotal interconnection 56 of said inner frame members. The beam 65 not only provides frame support and direction control as in the first form of the present invention, but in addition provides automatic control of the angularity of the individual raking wheels relative to a line of draft. The telescopic beam conveniently comprises an outer tube 66 pivotally connected to the inner frame member 54 and an inner tube 56 pivotally connected to the inner frame member 52 and slideably fitted to the outer tube 66. The tubes 66 and 67 are endwardly and angularly extended as at 68 and 69, respectively, and pivotally connected to the outer frame members 53 and 55 of their respective parallelogram members. The extensions 68 and 69 are angled relative to their respective tubes 66 and 67 so as to achieve parallel relation to the bearings 60 mounted on their respective parallelogram members. It will be observed that said extensions with their respective frame members and bearings form skewable parallelograms. A plurality of bores 70 are formed in the outer tube 66 and a bore 71 formed through the tube 67. The telescopic beam 65 is adjustably locked in predetermined longitudinal adjustment by the insertion of a pin 72 through an opening 70 aligned with the opening 71.

A pair of bifurcated yokes 28 are mounted on the telescopic beam 56, as described for their mounting on the beam 13 in the first form of the invention. Also as previously described, direction control wheels 29 are rotatably mounted in the yokes for rotation in substantially erect parallel planes in fixed angular relation to the beam 56 and preferably parallel to a line bisecting the angle formed between the inner frame members 52 and 54.

The second form of the invention operates in the manner described for the first form but with an additional advantage. The beam 65 in association with the portions of the inner frame members 52 and 53 lying between said beam and the pivotal interconnection 56 of said members form a bi-lateral triangle. No matter to what extent the telescopic beam 65 is extended or retracted, the direction control wheels 29 bear the same relation to a line bisecting the angle between the inner frame members. Inasmuch as the positions of the direction control wheels determine the line of draft and because the extensions 68 and 69 of the beam 65 are in fixed angular relation to said beam and at all times parallel to the bearings 60, telescopic extensions and retraction of the beam serves not only to adjust the width of swath of the rake and automatically the line of draft but simultaneously angles all of the rotary raking wheels 42 relative to their respective parallelogram members so that said raking wheels at all times maintain their predetermined angular relation to the line of draft. This permits the construction of a rake which maintains the raking wheels at substantially a 45° angle relative to the line of draft, or other predetermined angle, as may be desired, and the maintenance of such angularity automatically as the width of swath is adjusted.

It will be apparent in observing Fig. 6, that the provision of a skewable parallelogram frame for mounting rotary raking wheels in echelon and the provision of direction control means so associated therewith, provides a rake in which adjustment of the angularity of the frame relative to a line of draft by adjustment of the direction control means automatically repositions the raking wheels relative to the skewable parallelogram frame to maintain predetermined raking wheel attitude relative to a line of draft. This interdependence finds utility in a rake employing a single echelon as well as in a rake employing a pair of echelons in V arrangement.

The device of the present invention makes possible the gathering of hay in swaths of greater width than heretofore considered possible without in any way impairing the raking speeds of such rakes. The ready adjustment of the rake to varied swaths permits the expeditious adaptation thereof to varied raking requirements. The direction control means required in rakes of the type are automatically positioned in response to swath adjustment for the maintenance of desired line of draft. A rake employing a plurality of raking wheels arranged in echelon has been provided in which the angularity of the echelon is adjustable to achieve various raking swaths by adjustment of direction control means relative to such echelon and which simultaneously adjusts the angularity of the raking wheels in the echelon to achieve constant raking wheel position relative to a line of draft.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. In a side delivery rake having a forwardly movable substantially V-shaped draft frame including a pair of elongated, skewable parallelogram members each having forward and rearward end portions and elongated parallel side elements, the forward end portion of one of said members being pivotally connected to the other of said members at a position rearwardly adjacent to the forward end portion thereof, a plurality of bearings mounted transversely of each of the frame members and pivotally connected to opposite side elements thereof for angular positioning in response to skewing of said elements, raking wheel axles journaled in the bearings, rotary raking wheels mounted on the axles, the raking wheels individual to each frame member being arranged in echelon in substantially parallel erect planes, a telescopic beam pivotally interconnecting the frame members in adjustable spaced relation at positions substantially equidistant from the pivotal interconnection of said members and opposite side elements of the members for skewing of the members in response to the angular relation thereof, and direction control means mounted on the telescopic beam in supporting relation to the frame members and raking wheels borne thereby and in fixed angular relation to the telescopic beam.

2. In a side delivery rake, the combination of a V-frame consisting of a pair of elongated members having forward and rearward end portions, the forward end portion of one of said members being pivotally connected to the other of said members at a position rearwardly adjacent to the forward end thereof for adjustable angular positioning, each of said members having a pair of longitudinal elements and a plurality of transverse bearings pivotally interconnected in parallelogram arrangement; rotary raking wheels supported in the bearings, the raking wheels of the individual frame members being arranged in echelon in substantially erect parallel planes in fixed angular relation to their respective bearings; a telescopic beam pivotally interconnecting the frame members in adjustable spaced relation at positions substantially equi-distant from the pivotal connection of the members and pivotally interconnecting the longitudinal elements of the members in parallel relation to the transverse bearings thereof; and a pair of axially spaced direction control wheels mounted on the beam in supporting relation to the frame and raking wheels and in parallel relation in fixed angular relation to the beam.

3. In a side delivery rake having a forwardly movable substantially V-shaped draft frame including a pair of elongated members having forward and rearward end portions, each of said members having inner and outer longitudinal side elements in parallel relation, the forward end portion of the inner longitudinal element of one of said members being pivotally connected to the inner longitudinal element of the other of said members at a position rearwardly adjacent to the forward end portion thereof, a plurality of parallel bearings mounted transversely of each of the frame members and pivotally connected to each of the longitudinal elements of their respective members, axles journaled in the bearings and outwardly extended therefrom, rotary raking wheels mounted on the extended ends of the axles, the raking wheels of each frame member being arranged in echelon in substantially parallel erect planes, a telescopic beam pivotally interconnecting the inner longitudinal elements of each of the frame members in adjustable spaced relation at positions substantially equi-distant from the connection of said members, said telescopic beam having opposite endward extensions in fixed angular relation thereto pivotally connected to each of the outer longitudinal elements of the frame members in parallel relation to the bearings of the respective members, and direction control wheels rotatably mounted on the telescopic beam in supporting relation to the frame members and raking wheels borne thereby and in fixed angular relation to the telescopic beam.

4. In a side delivery rake, the combination of a frame having a pair of horizontally spaced elongated parallel elements, a plurality of parallel bearings arranged transversely of the frame elements and pivotally connected to each thereof, said bearings and elements forming a skewable parallelogram, rotary raking wheels arranged in echelon individually mounted by the bearings in substantially erect parallel planes, means for imparting earth traversing movement to the frame angularly related to the elongated elements thereof, a rigid member pivotally interconnecting the frame elements in parallel relation to the bearings, and a direction control wheel rotatably mounted by the rigid member in earth engagement and in predetermined horizontal angularity with the bearings whereby skewing of the frame automatically positions the direction control wheel to adjust the angularity of the frame relative to the line of draft and thus the swath of the rake while the predetermined angular relation of the individual raking wheels to the direction control wheel and thus the line of draft is maintained.

LOUIS CROWE.
RICHARD M. WORREL.

No references cited.